US007170937B2

(12) United States Patent
Zhou

(10) Patent No.: US 7,170,937 B2
(45) Date of Patent: Jan. 30, 2007

(54) COMPLEXITY-SCALABLE INTRA-FRAME PREDICTION TECHNIQUE

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 817 days.

(21) Appl. No.: 10/427,818

(22) Filed: May 1, 2003

(65) Prior Publication Data

US 2003/0206594 A1    Nov. 6, 2003

Related U.S. Application Data

(60) Provisional application No. 60/376,973, filed on May 1, 2002.

(51) Int. Cl.
*H04N 7/12* (2006.01)
*G06K 9/36* (2006.01)
(52) U.S. Cl. ............................. 375/240.01; 382/236
(58) Field of Classification Search ........... 375/240.01, 375/240.02, 240.12, 240.13, 240.14, 240.15; 382/236
See application file for complete search history.

(56) References Cited

U.S. PATENT DOCUMENTS

| 5,677,735 A * | 10/1997 | Ueno et al. ............ 375/240.15 |
| 6,556,718 B1 * | 4/2003 | Piccinelli et al. ........... 382/236 |
| 6,765,964 B1 * | 7/2004 | Conklin ................ 375/240.14 |

* cited by examiner

*Primary Examiner*—Gims Philippe
(74) *Attorney, Agent, or Firm*—Robert D. Marshall, Jr.; W. James Brady; Frederick J. Telecky, Jr.

(57) ABSTRACT

This invention is a method of encoding intra frames when encoding a motion picture. A set of intra frame prediction modes includes a low-complexity subset. A probability table relates the prediction mode of adjacent sub-blocks to the prediction mode of the current sub-block. For each combination of adjacent sub-blocks, the probability table includes a list of prediction modes in order of expected occurrence. The probability table is adjusted so that each list for prediction modes within the low-complexity subset include initial prediction modes of the low-complexity subset. Individual sub-blocks of intra frames are predictively coded in a low-complexity encoding the using the low-complexity subset or in a high-complexity encoding using any prediction mode. This permits a low-complexity decoder responsive to only the low-complexity subset.

13 Claims, 3 Drawing Sheets

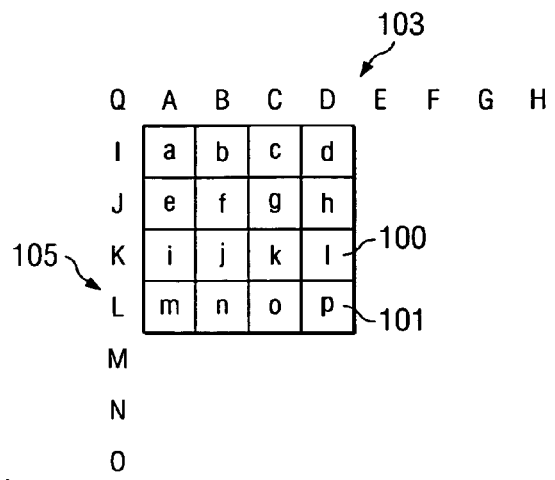
FIG. 1
*(PRIOR ART)*
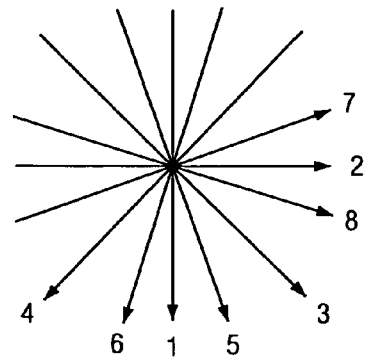
FIG. 2
*(PRIOR ART)*
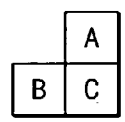
FIG. 3
*(PRIOR ART)*
FIG. 4
*(PRIOR ART)*
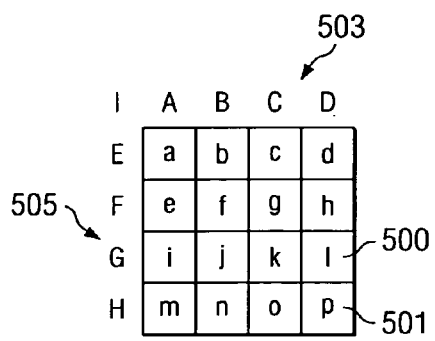
FIG. 5
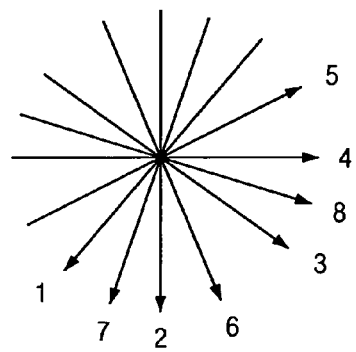
FIG. 6

COMPLEXITY-SCALABLE INTRA-FRAME PREDICTION TECHNIQUE

CLAIM OF PRIORITY

This application claims priority under 35 U.S.C. 119(e)(1) from U.S. Provisional Application No. 60/376,973 filed May 1, 2002.

TECHNICAL FIELD OF THE INVENTION

The technical field of this invention is that of motion picture data compression and more particularly to coding of intra-frame data.

BACKGROUND OF THE INVENTION

This invention concerns coding of motion picture information and relates to the H.26L video standard. Upon reconstruction of the motion picture data some frames, called intra frames, are predicted from adjacent frames. In the current H.26L standard intra-frames are predicted using a nine mode technique. As compared to a prior six mode technique, the nine mode technique is more efficient because it transmits less data. The nine mode technique increases both memory requirement and computational complexity by a factor about four. While the coding efficiency increase is of top priority on the high-end devices, the complexity increase is not favorable for the low-end H.26L applications. Therefore, it would be desirable to have a complexity-scalable intra frame prediction technique that serves the needs of both the low-end and high-end applications.

In the H.26L standard, during intra frame coding the 16 by 16 pixel luminance part of a macroblock is divided into 16 4 by 4 sub-blocks. Prediction is always used for each sub-block in a macroblock. The prediction mode is determined during encoding. Typically this takes place by comparing the original 4 by 4 sub-block with a corresponding 4 by 4 sub-block formed using each prediction mode. Generally the comparison is made by calculating the sum of the absolute difference of pixels between the original sub-block and candidate predicted sub-block. The prediction mode of the candidate predicted sub-block yielding the lowest sum of absolute differences is selected for that intra frame sub-block. This prediction mode is transmitted to the decoder in the bitstream. Transmission of this prediction mode information may be encoded for data compression as described below.

FIG. 1 illustrates a 4 by 4 pixel block 100 used to demonstrate prior art technique. Block 100 includes 16 pixels 101 to be coded labeled a through p. Outside and above block 100 are pixels 103 labeled A through H and Q. Outside and to the left of block 100 are pixels 105 labeled I through P. The pixels A to P and Q are from neighboring blocks which are already be decoded and used for prediction. Pixels E through H may not available because they have not yet been decoded, are outside the frame or outside the current independent slice. In this case the value of pixel D is substituted for pixels E through H. Similarly, when pixels M through P are not available, the value of pixel L is substituted for pixels M through P.

For the luminance signal in the H.26L standard, there are 9 intra frame prediction modes labeled 0 to 8. Mode 0 is DC-prediction mode. The other modes represent directions of predictions as indicated in FIG. 2. The predictions of these modes are given below.

Mode 0:DC Prediction

All pixels 101 are predicted by the average of the exterior pixels A, B, C, D, I, J, K and L. This is generally calculated as (A+B+C+D+I+J+K+L)/8. If any of the four horizontal pixels A to D are outside the frame, the average of the remaining four is used for prediction. Similarly, if any of the four vertical pixels I to L are outside the frame, the average of the remaining four is used for prediction. If all 8 pixels are outside the frame, the prediction value for all pixels 101 in block 100 is 128. A block will therefore always be predicted in this mode.

Mode 1: Vertical Prediction

If pixels A, B, C and D are inside the frame, then the pixels a through p are predicted in vertical slices. Thus pixels a, e, i and m are predicted by pixel A; pixels b, f, j and n are predicted by pixel B; pixels c, g, k and o are predicted by pixel C; and pixels d, h, l and p are predicted by pixel D.

Mode 2: Horizontal Prediction

If pixels I, J, K and L are inside the frame, then the pixels a through p are predicted in horizontal slices. Thus pixels a, b, c and d are predicted by pixel I; pixels e, f, g and h are predicted by pixel J; pixels i, j, k and l are predicted by pixel K; and pixels m, n, o and p are predicted by pixel L.

Mode 3: Diagonal Down/Right Prediction

This mode is used only if all pixels A, B, C, D, I, J, K, L and Q are inside the frame. This is a diagonal prediction. Pixels a through p are predicted according to Table 1.

TABLE 1

| Predicted Pixels | Formula |
| --- | --- |
| m | (J + 2K + L + 2)/4 |
| i, n | (I + 2J + K + 2)/4 |
| e, j, o | (Q + 2I + J + 2)/4 |
| a, f, k, p | (A + 2Q + I + 2)/4 |
| b, g, l | (Q + 2A + B + 2)/4 |
| c, h | (A + 2B + C + 2)/4 |
| d | (B + 2C + D + 2)/4 |

Mode 4: Diagonal Down/Left Prediction

This mode is used only if all pixels A, B, C, D, I, J, K, L and Q are inside the frame. This is a diagonal prediction. Pixels a through p are predicted according to Table 2.

TABLE 2

| Predicted Pixels | Formula |
| --- | --- |
| a | (A + 2B + C + I + 2J + K + 4)/8 |
| b, e | (B + 2C + D + J + 2K + L + 4)/8 |
| c, f, i | (C + 2D + E + K + 2L + M + 4)/8 |
| d, g, i, m | (D + 2E + F + L + 2M + N + 4)/8 |
| h, k, n | (E + 2F + G + M + 2N + O + 4)/8 |
| i, o | (F + 2G + H + N + 2O + P + 4)/8 |
| p | (G + H + O + P + 2)/4 |

Mode 5: Vertical-Left Prediction

This mode is used only if all pixels A, B, C, D, I, J, K, L and Q are inside the frame. This is a diagonal prediction. Pixels a through p are predicted according to Table 3.

TABLE 3

| Predicted Pixels | Formula |
| --- | --- |
| a, j | (Q + A + 1)/2 |
| b, k | (A + B + 1)/2 |
| c, l | (B + C + 1)/2 |

TABLE 3-continued

| Predicted Pixels | Formula |
|---|---|
| d | (C + D + 1)/2 |
| e, n | (I + 2Q + A + 2)/4 |
| f, o | (Q + 2A + B + 2)/4 |
| g, p | (A + 2B + C + 2)/4 |
| h | (B + 2C + D + 2)/4 |
| i | (Q + 2I + J + 2)/4 |
| m | (I + 2J + K + 2)/4 |

Mode 6: Vertical-Right Prediction

This mode is used only if all pixels A, B, C, D, I, J, K, L and Q are inside the frame. This is a diagonal prediction. Pixels a through p are predicted according to Table 4.

TABLE 4

| Predicted Pixels | Formula |
|---|---|
| a | (2A + 2B + J + 2K + L + 4)/8 |
| b, i | (B + C + 1)/2 |
| c, j | (C + D + 1)/2 |
| d, k | (D + E + 1)/2 |
| l | (E + F + 1)/2 |
| e | (A + 2B + C + K + 2L + M + 4)/8 |
| f, m | (B + 2C + D + 2)/4 |
| g, n | (C + 2D + E + 2)/4 |
| h, o | (D + 2E + F + 2)/4 |
| p | (E + 2F + G + 2)/4 |

Mode 7: Horizontal-Up Prediction

This mode is used only if all pixels A, B, C, D, I, J, K, L and Q are inside the frame. This is a diagonal prediction. Pixels a through p are predicted according to Table 5.

TABLE 5

| Predicted Pixels | Formula |
|---|---|
| a | (B + 2C + D + 2I + 2J + 4)/8 |
| b | (C + 2D + E + I + 2J + K + 4)/8 |
| c, e | (D + 2E + F + 2J + 2K + 4)/8 |
| d, f | (E + 2F + G + J + 2K + L + 4)/8 |
| g, i | (F + 2G + H + 2K + 2L + 4)/8 |
| h, j | (G + 3H + K + 3L + 4)/8 |
| l, n | (L + 2M + N + 2)/4 |
| k, m | (G + H + L + M + 2)/4 |

TABLE 5-continued

| Predicted Pixels | Formula |
|---|---|
| o | (M + N + 1)/2 |
| p | (M + 2N + O + 2)/4 |

Mode 8: Horizontal-Down Prediction

This mode is used only if all pixels A, B, C, D, I, J, K, L and Q are inside the frame. This is a diagonal prediction. Pixels a through p are predicted according to Table 6.

TABLE 6

| Predicted Pixels | Formula |
|---|---|
| a, g | (Q + I + 1)/2 |
| b, h | (I + 2Q + A + 2)/4 |
| c | (Q + 2A + B + 2)/4 |
| d | (A + 2B + C + 2)/4 |
| e, k | (I + J + 1)/2 |
| f, l | (K + 2I + J + 2)/4 |
| i, o | (J + K + 1)/2 |
| j, p | (I + 2J + K + 2)/4 |
| m | (K + L + 1)/2 |
| n | (J + 2K + L + 2)/4 |

Since each of the 4 by 4 pixel luminance blocks are assigned a prediction mode, this requires a large number of bits if coded directly. There are a number of more efficient ways of coding mode information. The best prediction mode of a block is highly correlated with the prediction modes of adjacent blocks.

FIG. 3 illustrates how the prediction modes of adjacent blocks is used to select the prediction mode of a current block. Referring to FIG. 3, when the prediction modes of block A and block B are known (including the case that either block A or block B or both are outside the frame), an ordering of the most probable, next most probable prediction modes for block C is determined. When an adjacent block A or B is coded by 16 by 16 pixel intra mode, the prediction mode of the current block C is set to mode 0, DC prediction. When an adjacent block A or B is coded by 16 by 16 pixel inter mode, the prediction mode of the current block C is to mode 0, DC prediction in the usual case and outside in the case of a constrained intra update. Table 7 lists this ordering.

TABLE 7

| B/A | Outside | 0 | 1 | 2 | 3 |
|---|---|---|---|---|---|
| Outside | 0-------- | 01------- | 10------- | --------- | --------- |
| 0 | 02------- | 021648573 | 125630487 | 021876543 | 021358647 |
| 1 | --------- | 102654387 | 162530487 | 120657483 | 102536487 |
| 2 | 20------- | 280174365 | 217683504 | 287106435 | 281035764 |
| 3 | --------- | 201385476 | 125368470 | 208137546 | 325814670 |
| 4 | --------- | 201467835 | 162045873 | 204178635 | 420615837 |
| 5 | --------- | 015263847 | 152638407 | 201584673 | 531286407 |
| 6 | --------- | 016247583 | 160245738 | 206147853 | 160245837 |
| 7 | --------- | 270148635 | 217608543 | 278105463 | 270154863 |
| 8 | --------- | 280173456 | 127834560 | 287104365 | 283510764 |

| B/A | 4 | 5 | 6 | 7 | 8 |
|---|---|---|---|---|---|
| Outside | --------- | --------- | --------- | --------- | --------- |
| 0 | 206147583 | 512368047 | 162054378 | 204761853 | 208134657 |
| 1 | 162045378 | 156320487 | 165423078 | 612047583 | 120685734 |
| 2 | 287640153 | 215368740 | 216748530 | 278016435 | 287103654 |

TABLE 7-continued

| 3 | 421068357 | 531268470 | 216584307 | 240831765 | 832510476 |
| 4 | 426015783 | 162458037 | 641205783 | 427061853 | 204851763 |
| 5 | 125063478 | 513620847 | 165230487 | 210856743 | 210853647 |
| 6 | 640127538 | 165204378 | 614027538 | 264170583 | 216084573 |
| 7 | 274601853 | 271650834 | 274615083 | 274086153 | 278406153 |
| 8 | 287461350 | 251368407 | 216847350 | 287410365 | 283074165 |

Table 7 lists 9 numbers for each prediction mode of blocks A For example, suppose the prediction mode for block A is mode 2 and for block B is also mode 2. Table 7 lists the string 2 8 7 1 0 6 4 3 5. This indicates that mode 2 is also the most probable prediction mode for the current block C. Mode 8 is the next most probable prediction mode, etc. The compressed bitstream will include information that Prob0=1. This indicates that the next most probable mode (mode 8 in this example) shall be used for block C. The appearance of the symbol 'B' in Table 7 indicates that this instance cannot occur because either block A or block B or both are outside the frame.

For more efficient coding, information on intra prediction of two 4 by 4 pixel luminance blocks are included in one codeword. FIG. 4 illustrates the order of coding of the 16 4 by 4 pixel sub-blocks in a 16 by 16 pixel macroblock. Table 8 lists the universal variable length coding (UVLC) for these combined codewords, where the entries in the UVLC_prob array are the UVLC code_numbers addressed by value of (prob0, prob1) pair UVLC_Prob[prob0=0, 1, Y8] [prob1=0, 1, Y8].

TABLE 8

| 0  | 1  | 4  | 6  | 10 | 14 | 19 | 25 | 32 |
| 2  | 3  | 8  | 13 | 17 | 21 | 30 | 37 | 45 |
| 5  | 9  | 16 | 22 | 27 | 35 | 44 | 46 | 57 |
| 7  | 12 | 20 | 28 | 36 | 42 | 51 | 59 | 65 |
| 11 | 18 | 26 | 34 | 38 | 50 | 54 | 63 | 69 |
| 15 | 23 | 33 | 43 | 49 | 55 | 61 | 68 | 72 |
| 24 | 29 | 41 | 52 | 56 | 60 | 70 | 74 | 77 |
| 31 | 39 | 47 | 58 | 62 | 66 | 74 | 76 | 79 |
| 40 | 48 | 53 | 64 | 67 | 73 | 75 | 78 | 80 |

This prior art intra frame prediction method requires the storage of two tables corresponding to Table 7 and Table 8 in the decoder. The probability Table 7 requires 10×10×9/2=450 bytes memory for an ASIC design. For a digital signal processor (DSP) design this number is higher if each number in Table 7 is stored as byte. This storage requires 900 bytes. The UVLC table (corresponding to Table 8) requires 9×9=81 bytes for storage. Considering that the memory requirement for storing the rest of tables in H.26L standard is less than 338 bytes, this memory requirement for intra frame prediction is extremely high. Such a high memory requirement can be easily critical for ASIC and DSP implementation.

In low-complexity H.26L codecs, it is desirable to use only a subset of the total nine intra frame prediction modes in order to reduce the memory requirement and computational complexity. However, the current intra frame prediction method cannot be scaled in this manner. In Table 7 prediction modes 0 to 8 spread over all the nine probability positions in each string. Therefore, even if a subset of the prediction modes is used, the decoder has to store a portion of Table 7 and the entire Table 8. For example, if only 6 modes are used, the memory size for DSP implementation is 7×7×9 (portion of Table 7)+81 (UVLC Table 8)=522 bytes. This is barely an improvement over storing all this decode data.

SUMMARY OF THE INVENTION

This invention is a method of encoding intra frames when encoding a motion picture. A set of intra frame prediction modes includes a low-complexity subset. A probability table relates the prediction mode of adjacent sub-blocks to the prediction mode of the current sub-block. For each combination of adjacent sub-blocks, the probability table includes a list of prediction modes in order of expected occurrence. The probability table is adjusted so that each list for prediction modes within the low-complexity subset include initial prediction modes of the low-complexity subset.

Individual sub-blocks of intra frames are predictively coded as follows. In a low-complexity encoding the prediction mode for each sub-block is within the low-complexity subset. In a high-complexity encoding may use any prediction mode. This permits a low-complexity decoder responsive to only the low-complexity subset.

The definition of the prediction modes and the probability table and their low-complexity subsets and occurs once upon definition of an encoding standard. Selection of low-complexity encoding or high-complexity encoding may occur once upon manufacture of an encoder or may occur for each encoding of a motion picture.

BRIEF DESCRIPTION OF THE DRAWINGS

These and other aspects of this invention are illustrated in the drawings, in which:

FIG. 1 illustrates the relationship between pixels used in intra frame prediction according to the prior art;

FIG. 2 illustrates the syntax directions according to the prior art;

FIG. 3 illustrates the relationship between prior predicted frames and the current frame according to the prior art;

FIG. 4 illustrates the coding order of pairs of 4 by 4 pixel sub-blocks according to the prior art;

FIG. 5 illustrates the relationship between pixels used in intra frame prediction according to one example of this invention;

FIG. 6 illustrates the syntax directions according to this example of this invention;

DETAILED DESCRIPTION OF PREFERRED EMBODIMENTS

Figure 7:
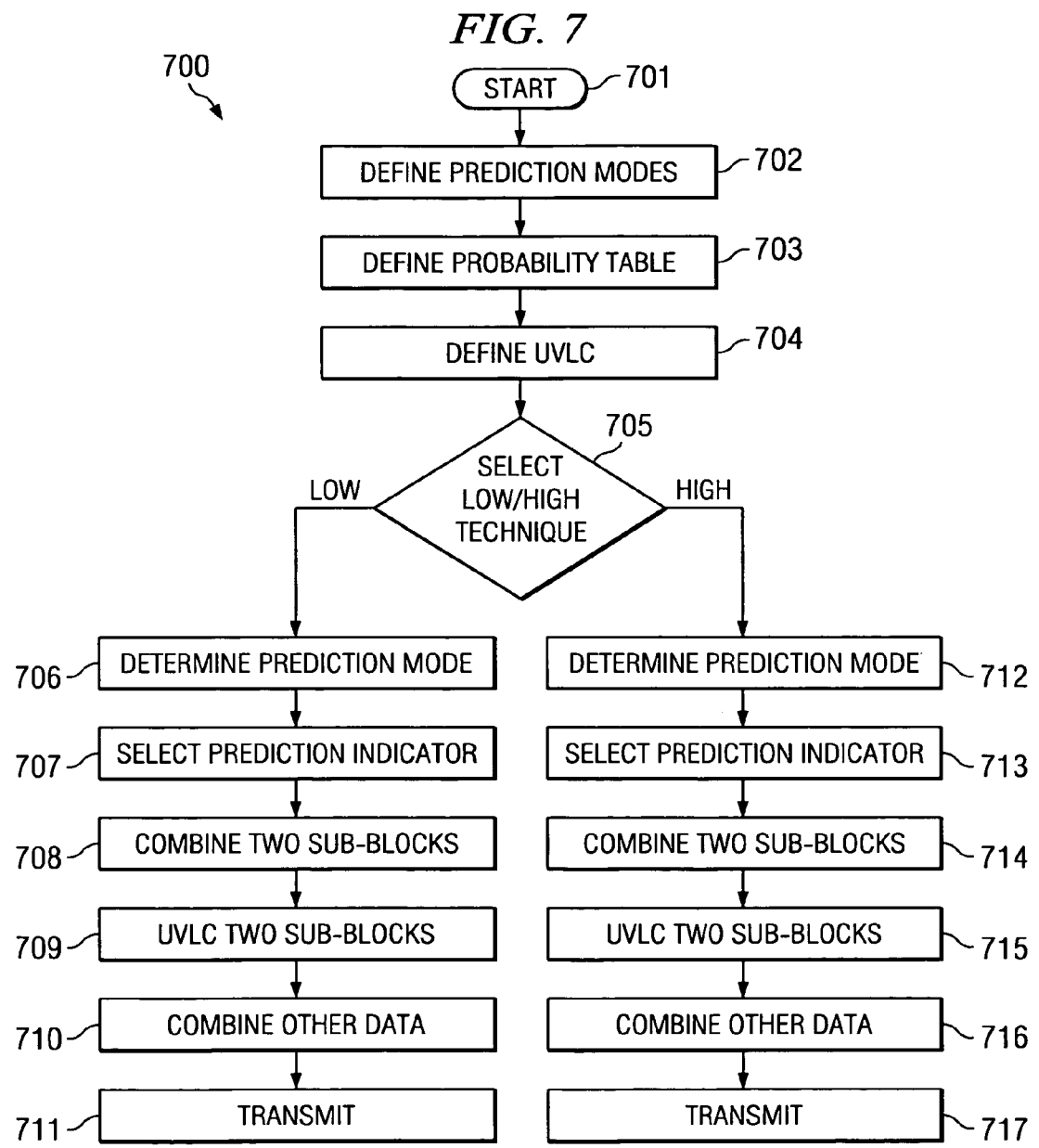
FIG. 7 illustrates a flow chart of encoding according to this invention.

The complexity scalable intra frame prediction method of this invention satisfies the needs of both low-complexity and high-complexity H.26L codecs. The memory and computational resource may be highly limited for low-end codecs, so a low-complexity intra frame prediction scheme is desired. On high-end codecs such as PCs, where memory and computational complexity are not a concern, coding efficiency is of high priority. This invention provides a complex and but highly efficient intra frame prediction technique. In addition, there is backward compatibility between the low-complexity and high-complexity techniques. Thus the high-end decoder can decode the bitstreams generated by the low-end encoder. This is achieved because the low-complexity intra frame prediction scheme is a subset of the high-complexity scheme.

The intra frame prediction technique of this invention operates as follows. Let: $\{0, 1, \ldots M-1\}$ be the M prediction modes supported with probability in descending order; N be the number of complexity scalability layers; $M_0, M_1 \ldots M_{N-2}, M_{N-1}$ are number of modes supported in each layer with $M_0, <M_1 \ldots <M_{N-2}<M_{N-1}$ ($M_{N-1}=M$). Due to the backward compatibility a higher layer contains all the modes supported by a lower layer. Therefore, layer 0 contains mode $0, 1 \ldots M_0-1$, layer 1 contains mode $0, 1, 2 \ldots M_0-1$, $M_0 \ldots M_1-1 \ldots$ and layer N-1 supports all the modes, i.e. mode $0, 1, 2 \ldots M-1$. The following rules are used for the constructing the probability table shown in Table 9.

1. $n=0$; $M_{-1}=1$;
2. For prediction mode of adjacent blocks A and B as illustrated in FIG. 3 less than M, but larger or equal to $M_{n-1}$, each string in the probability table is divided into N-n groups: in mode $0, 1 \ldots M_n-1$ can only be placed from position 0 to $M_n-1$; mode $M_n, M_n+1 \ldots M_{n+1}-1$ can only be placed from position $M_n$ to $M_{n+1}-1$; ... and mode $M_{N-2}, M_{N-2}+1 \ldots M_{N-1}-1$ can only be placed from position $M_{N-2}$ to $M_{N-1}-1$, based on their probabilities; and
3. If $(n<N-1)$ $\{n++$, go to $2\}$; else exit.

An example illustrated in Table 9 and Table 10 is used to explain the general concept of the complexity-scalable intra prediction described above. In this particular case two complexity layers are established (i.e. M=9, N=2, $M_0=6$, $M_1=9$). There are in total 9 prediction modes (0, 1, 2 . . . 8), only six modes (0, 1, 2, 3, 4, 5) are supported in the low-complexity layer. So the nine modes are divided into two sub-groups, layer 0 with modes 0, 1, 2, 3, 4 and 5, and layer 1 with modes 0, 1, 2, 3, 4, 5, 6, 7 and 8. In order to ensure the highest possible coding efficiency in the low-complexity scheme, any mode in layer 0 has higher probability than modes 6, 7, 8.

A limitation then is imposed on construction of the probability table. As shown in Table 9, for blocks A and B having intra frame prediction modes less than 6 ($M_0$), the strings are divided into two groups. These are marked in Table 9 by boldface and normal text. Modes 0, 1, . . . 5 can only appear in the first part positions from 0 to 5 (boldface) in order of their probabilities. Modes 6, 7 and 8 can only spread in the second part positions from 6 to 8 (normal text). For blocks A or B having intra frame prediction modes larger than 5, no limitation is imposed. For these cases, the nine modes of the current block can spread all over the nine positions in each string, depending on their probabilities.

TABLE 9

| B/A | Outside | 0 | 1 | 2 | 3 |
|---|---|---|---|---|---|
| Outside | 0-------- | 021------ | 102------ | 201------ | 012------ |
| 0 | 045------ | 041253687 | 104235687 | 230145687 | 304215687 |
| 1 | 045------ | 014253678 | 102435678 | 201345678 | 032154687 |
| 2 | 045------ | 024135678 | 120345678 | 210345678 | 302145687 |
| 3 | 045------ | 304152867 | 310425687 | 231054687 | 304215687 |
| 4 | 405------ | 403512867 | 401523867 | 245031687 | 430512867 |
| 5 | 504------ | 504312867 | 015432687 | 204513687 | 530412687 |
| 6 | 504------ | 016234758 | 261308457 | 216304578 | 360214857 |
| 7 | 504------ | 015463278 | 102576438 | 215680347 | 025136478 |
| 8 | 504------ | 840315627 | 038145627 | 234185607 | 384156207 |

| B/A | 4 | 5 | 6 | 7 | 8 |
|---|---|---|---|---|---|
| Outside | 012------ | 012------ | 012------ | 012------ | 012------ |
| 0 | 043152867 | 045132687 | 602314587 | 014627538 | 048356217 |
| 1 | 041253867 | 014532678 | 261354087 | 160275438 | 024385167 |
| 2 | 042513687 | 012543687 | 261350487 | 261705348 | 230451867 |
| 3 | 403512867 | 304512867 | 360214587 | 015364278 | 380456217 |
| 4 | 405312867 | 405132687 | 456231807 | 401537268 | 480531267 |
| 5 | 450312867 | 504132687 | 560243187 | 415073286 | 584631207 |
| 6 | 401362578 | 145062387 | 623105487 | 015462738 | 034816257 |
| 7 | 064517328 | 501436278 | 320156478 | 102574683 | 051348726 |
| 8 | 480315627 | 048351627 | 304682157 | 041368257 | 843025617 |

Table 10 lists the universal variable length coding (UVLC) according to this example of the invention for combined codewords according to FIG. 4. Those codes rendered in boldface are required for both low-complexity and high-complexity systems. Those codes rendered in normal type are required only in high-complexity systems.

TABLE 10

| 0 | 2 | 5 | 6 | 11 | 15 | 16 | 24 | 46 |
|---|---|---|---|---|---|---|---|---|
| 1 | 4 | 9 | 12 | 22 | 25 | 30 | 38 | 59 |
| 3 | 8 | 14 | 20 | 27 | 36 | 32 | 52 | 63 |
| 7 | 13 | 21 | 29 | 37 | 43 | 45 | 56 | 70 |
| 10 | 19 | 28 | 35 | 39 | 47 | 53 | 60 | 71 |
| 18 | 23 | 34 | 42 | 49 | 55 | 61 | 68 | 76 |
| 17 | 26 | 33 | 41 | 44 | 54 | 62 | 66 | 75 |

TABLE 10-continued

| 31 | 40 | 50 | 48 | 57 | 65 | 69 | 73 | 79 |
|----|----|----|----|----|----|----|----|----|
| 51 | 58 | 64 | 67 | 72 | 74 | 77 | 78 | 80 |

Thus the low-complexity intra frame prediction technique uses modes 0 to 5 and only needs to store the sub-tables marked in boldface in Tables 9 and 10. The high-complexity technique stores entire Tables 9 and 10. Since the low-complexity technique is a strict subset of the high-complexity technique, backward compatibility is guaranteed.

The low-complexity scheme has a reduced memory requirement. In this particular example, the low-complexity decoder requires only 7×7×6 bytes (from the probability sub-table of Table 9)+36 (from the UVLC sub-table of Table 10)=310 bytes to store needed decode data. This is about 40% saving compared to 522 bytes needed in the prior H.26L intra frame prediction when six modes used.

FIG. 5 illustrates a 4 by 4 pixel block 500 used to demonstrate the invention. Block 500 includes 16 pixels 501 to be coded labeled a through p. Outside and above block 500 are pixels 503 labeled A through D and I. Outside and to the left of block 500 are pixels 505 labeled E through H. The pixels A to H and I are from neighboring blocks which are already be decoded and used for prediction.

An example nine mode codings corresponding to Tables 9 and 10 above is described below. The (prob0, prob1) coding is unchanged expect for the UVLC table (Table 10) differs from the prior H.26L standard. Note that the modes defined below already existed in the previous H.26L versions. FIG. 6 illustrates the syntax directions of these modes.

Mode 0: DC Prediction

All pixels 501 are predicted by (A+B+C+D+E+F+G+H)/8. If four of the pixels A through H are outside the frame, the average of the remaining four is used for prediction. If all 8 pixels A through H are outside the frame the predicted value for all pixels 101 is 128. A block will therefore always be predicted in this mode.

Mode 1: Vertical/Diagonal Prediction

This mode is used only if all pixels 503 A, B, C and D are inside the frame. Pixels a through p are predicted according to Table 11.

TABLE 11

| Predicted Pixels | Formula |
|---|---|
| a | (A + B)/2 |
| e | B |
| b, i | (B + C)/2 |
| f, m | C |
| c, j | (C + D)/2 |
| d, g, h, j, k, l, n, o, p | D |

Mode 2: Vertical Prediction

If pixels A, B, C and D are inside the frame, then: pixels a, e, i and m are predicted by pixel A; pixels b, f, j and n are predicted by pixel B; pixels c, g, k and l are predicted by pixel C; and pixels g, h, l and p are predicted by pixel D.

Mode 3: Diagonal Prediction

This mode is used only if all pixels A, B, C, D, E, F, G, H and I are inside the frame. This is a diagonal prediction. Pixels a through p are predicted according to Table 12.

TABLE 12

| Predicted Pixels | Formula |
|---|---|
| m | (H + 2G + F)/4 |
| i, n | (G + 2F + E)/4 |
| e, j, o | (F + 2E + I)/4 |
| a, f, k, p | (E + 2I + A)/4 |
| b, g, l | (I + 2A + B)/4 |
| c, h | (A + 2B + C)/4 |
| d | (B + 2C + D)/4 |

Mode 4: Horizontal Prediction

If pixels E, F, G and H are inside the frame, then: pixels a, b, c and d are predicted by pixel E; pixels e, f, g and h are predicted by pixel F; pixels i, j, k and l are predicted by pixel G; and pixels m, n, o and p are predicted by pixel H.

Mode 5: Horizontal/Diagonal Prediction

This mode is used only if all pixels E, F, G and H are inside the frame. Pixels a through p are predicted according to Table 13.

TABLE 13

| Predicted Pixels | Formula |
|---|---|
| a | (E + F)/2 |
| b | F |
| c, e | (F + G)/2 |
| f, d | G |
| i, g | (G + H)/2 |
| h, j, k, l, m, n, o, p | H |

Mode 6: Vertical-Left Prediction

This mode is used only if all pixels A, B, C, D, E, F, G, H and I are inside the frame. This is a diagonal prediction. Pixels a through p are predicted according to Table 14.

TABLE 14

| Predicted Pixels | Formula |
|---|---|
| a, j | (I + A + 1)/2 |
| b, k | (A + B + 1)/2 |
| c, l | (B + C + 1)/2 |
| d | (C + D + 1)/2 |
| e, n | (E + 2I + A + 2)/4 |
| f, o | (I + 2A + B + 2)/4 |
| g, p | (A + 2B + C + 2)/4 |
| h | (B + 2C + D + 2)/4 |
| i | (I + 2E + F + 2)/4 |
| m | (E + 2F + G + 2)/4 |

Mode 7: Vertical-Right Prediction

This mode is used only if all pixels A, B, C, D, E, F, G, H and I are inside the frame. This is a diagonal prediction. Pixels a through p are predicted according to Table 15.

TABLE 15

| Predicted Pixels | Formula |
|---|---|
| a | (2(A + B + G) + F + H + 4)/8 |
| b, i | (B + C + 1)/2 |
| c, j | (C + D + 1)/2 |
| d, k | (D + E + 1)/2 |
| l | (E + F + 1)/2 |
| e | (2(B + H) + A + C + G + H + 4)/8 |
| f, m | (B + 2C + D + 2)/4 |
| g, n | (C + 2D + E + 2)/4 |

TABLE 15-continued

| Predicted Pixels | Formula |
| --- | --- |
| h, o | (D + 2E + F + 2)/4 |
| p | (E + 2F + G + 2)/4 |

Mode 8: Horizontal-Down Prediction

This mode is used only if all pixels A, B, C, D, E, F, G, H and I are inside the frame. This is a diagonal prediction. Pixels a through p are predicted according to Table 16.

TABLE 16

| Predicted Pixels | Formula |
| --- | --- |
| a, g | (I + E + 1)/2 |
| b, h | (E + 2I + A + 2)/4 |
| c | (I + 2A + B + 2)/4 |
| d | (A + 2B + C + 2)/4 |
| e, k | (E + F + 1)/2 |
| f, l | (I + 2E + F + 2)/4 |
| i, o | (F + G + 1)/2 |
| j, p | (E + 2F + G + 2)/4 |
| m | (G + H + 1)/2 |
| n | (F + 2G + H + 2)/4 |

FIG. 7 illustrates a flow chart showing the steps of encoding 700 according to this invention. Encoding 700 begins at start block 701. The initial action of encoding 700 is definition of the intra frame prediction modes (block 702). This definition could be according to the example of modes 0 to 8 described above in relation to FIG. 5 and Tables 11 to 16. This definition of the intra frame prediction modes must include an initial subset of modes suitable for a low-complexity embodiment of the invention. This means that the initial subset must be suitable for a low computational decoding which may yield lower data compression.

Encoding 700 next defines prediction probability tables for each possible intra frame prediction mode of a predetermined set of adjacent sub-blocks. This could be according to the example of Table 9 above. Each entry in the prediction probability table is a list of the intra frame prediction modes in order of their expected probability. The example of Table 9 is based upon the adjacent sub-blocks defined in FIG. 3. A subset of the probability table in which both the prior sub-blocks are outside the frame or within the subset of intra frame prediction modes of the low-complexity technique must have special properties. Let the number of intra frame prediction modes be N and the total number of modes be M. Each entry in the probability table will have M entries. For probability table entries within the subset, the first N entries of each list must be taken from the subset of prediction modes. As explained above, this permits complete specification of the frame data employing only the subset of intra frame prediction modes. Note that for probability table entries outside this subset, that is probability table entries in which at least one prior sub-block has a prediction mode outside the subset, are not so limited.

Encoding 700 next defines a universal variable length coding table (block 704). This could be according to the example of Table 10. Note that this universal variable length coding table must include a subset usable with the subset of intra frame prediction modes as described above.

Encoding 700 next selected the low-complexity technique or the high-complexity technique (decision block 705). The manner of encoding differs depending on this selection as will be described below.

If encoding 700 operates in the low-complexity technique (LOW at decision block 705), then encoding 700 determines the prediction mode for each sub-block in the current intra frame (block 706). As described above, the prior art technique for this determination includes forming a prediction for each sub-block in each of the prediction modes, then comparing the prediction to the actual sub-block data. The comparison typically is based on the sum of absolute differences between the predicted sub-block and the actual sub-block. The prediction mode yielding the best prediction, such as the lowest sum of absolute differences, is selected. In the low-complexity technique the prediction modes selected are limited to the subset previously defined (block 702).

Encoding 700 next employs the probability table to encode the prediction mode of the sub-block (block 707). The prediction modes of the adjacent sub-blocks determines the entry in the probability table. The prediction mode determined for the sub-block is matched with the list of the appropriate probability table entry. The determined prediction mode is matched against list of the corresponding entry. The position on this list is noted. In block 708 these positions for two adjacent blocks (as shown in FIG. 4) are encoded together. These paired of probability data is coded via the previously determined universal variable length code (block 709).

The encoded data for the intra frames is combined with other data concerning the motion picture (block 710). This other data is derived from the original motion picture in a conventional fashion not relevant to this invention. This combined data is transmitted to the decoder via conventional means (block 711).

If encoding 700 operates in the high-complexity technique (HIGH at decision block 705), then encoding 700 determines the prediction mode for each sub-block in the current intra frame (block 712) in the manner previously described. Note that in the high-complexity technique all prediction modes may be used. This differs from the low-complexity technique which may select only the subset of prediction modes.

Encoding 700 next employs the probability table to encode the prediction mode of the sub-block (block 713). In contrast to the low-complexity technique, the high-complexity technique may use the entire probability table. In block 714 these positions for two adjacent blocks (as shown in FIG. 4) are encoded together. These paired of probability data is coded via the previously determined universal variable length code (block 715). Note that the high-complexity technique may use the entire universal variable length coding table and not just the subset used by the low-complexity technique.

The encoded data for the intra frames is combined with other data concerning the motion picture (block 716). This other data is derived from the original motion picture in a conventional fashion not relevant to this invention. This combined data is transmitted to the decoder via conventional means (block 717).

This invention contemplates that blocks 702, 703 and 704 will be performed once upon setting up the coding standard. Following initialization of the standard, these blocks need not be repeated for every motion picture encoding. This invention contemplates that the low-complexity/high-complexity technique selection of block 705 may be performed upon product manufacture or on initialization of each encoding. An example of selection upon product manufacture is production of an encoder capable of only the low-complexity technique. Such an encoder will always use the low-complexity technique. Another option is production of an encoder capable of only the high-complexity technique. As an alternative, a single encoder could be constructed permitting operator selection of the technique for each motion picture. Such an encoder could encode motion picture data for a low-complexity technique only decoder, for a high-complexity technique only decoder or for a decoder capable of both techniques.

FIG. 7 fails to provide all the details necessary for a practical implementation of this invention. As an example, FIG. 7 fails to illustrate repetition of blocks 706, 707, 708, 709 and 710 (or blocks 712, 713, 714, 715, 716 and 717) for plural intra frames, nor the encoding of inter frames and other data. However, such details are within the capability of one skilled in the art from this description.

Figure 8:
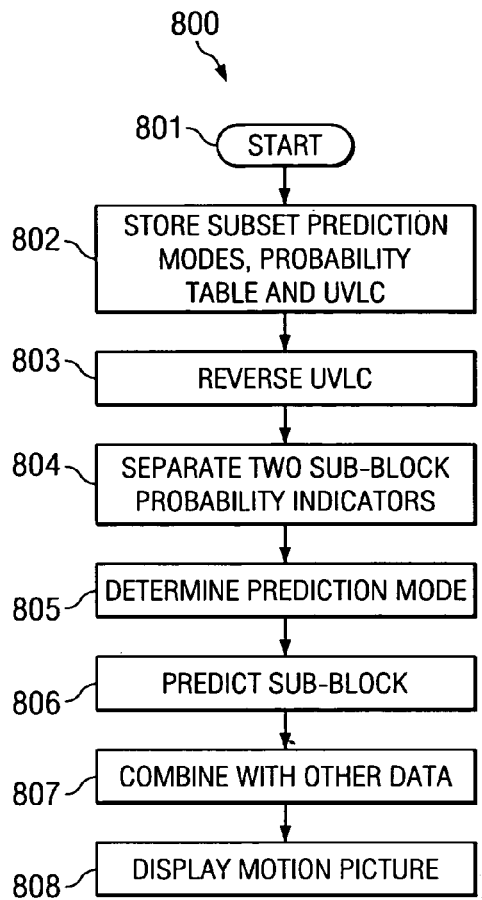
FIG. 8 illustrates a flow chart of decoding according to the low-complexity technique of this invention.

FIG. 8 illustrates flow chart showing the steps of the low-complexity technique decoding 800 according to this invention. Decoding 800 begins with start block 801. Decoding 800 initially stores the subset prediction modes, probability table and universal variable length code table. An example of the subset prediction modes are modes 0 to 6 described and defined above. An example of subset probability table is illustrated in the boldface entries of Table 9. An example of the subset universal variable length coding table in illustrated in the boldface entries of Table 10. Not that decoder 800 operating using the low-complexity technique can only use the subsets and cannot decode data including modes 6, 7 or 8.

Decoder 800 next reverses the universal variable length coding of the probability entries (block 803) via the stored table. The two combined sub-block probability indicators are separated (block 804) using the definition of FIG. 4. Decoder 800 next determines the prediction mode for the current sub-block (block 805). The prediction modes of the adjacent sub-blocks determines which list to reference within the subset probability table. The probability indicator for that sub-block determines the place within the list denoting the prediction mode for that sub-block. Decoder 800 employs the thus determined prediction mode and the data from adjacent previously decoded sub-blocks to predicted the current sub-block (block 806). Decoder 800 combines this predicted sub-block data with other data in the received bitstream to form the plural frames of the motion picture (block 807). Decoder 800 enables this motion picture to be displayed or otherwise utilized (block 808). Not shown in FIG. 8 is the necessary repetition for other intra frames.

Figure 9:
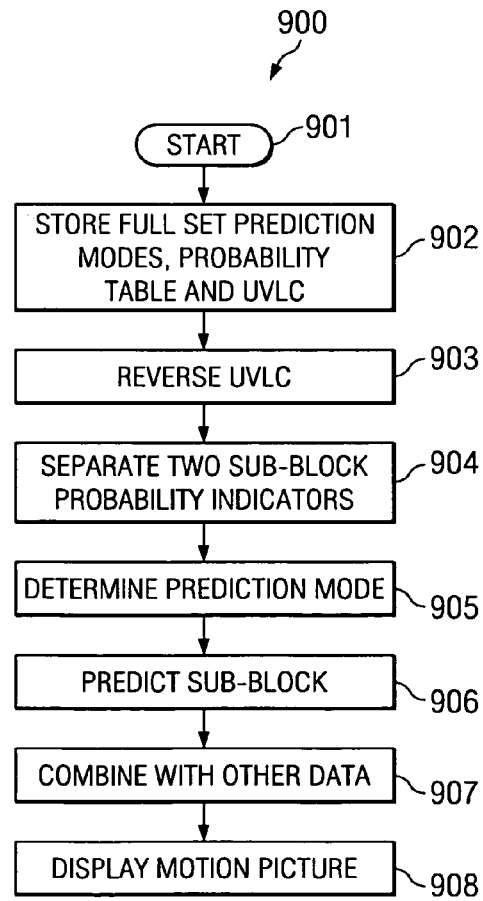
FIG. 9 illustrates a flow chart of decoding according to the high-complexity technique of this invention.

FIG. 9 illustrates flow chart showing the steps of the high-complexity technique decoding 900 according to this invention. Decoding 900 begins with start block 901. Decoding 900 initially stores the full data of the prediction modes, probability table and universal variable length code table. An example of the prediction modes are modes 0 to 8 described and defined above. An example of probability table is the whole table listed in Table 9. An example of the universal variable length coding table is the whole table of Table 10. Decoder 900 operating using the high-complexity technique can use any of the modes 0 to 8.

The remaining portions of decoder 900 are similar to decoder 800. Note that decoder 900 employs all the nine modes, the whole probability table and the whole universal variable length coding table. Thus decoding 900 reverses the universal variable length coding of the probability entries (block 903), separates the two combined sub-block probability indicators (block 904), determines the prediction mode for the current sub-block (block 905), predicts the current sub-block (block 906), combines the other data (block 907) and displays the decoded motion picture (block 908).

This invention has the following advantages compared to the H.26L intra frame prediction:

1. Simplicity: This invention requires only nine boundary pixels from the adjacent blocks (A, B, C, D, E, F, G, H and I in FIG. 5, compare to FIG. 1) in prediction; modes 0 to 5 are much simpler than those in the current H.26L standard.

2. Complexity-scalability: This invention allows two layers of complexity scalability. A low-complexity codec can support the first six prediction modes, while a high-complexity codec can use all the nine modes. Full backward compatibility between the high-complexity and low-complexity codecs is maintained. The inventive complexity-scalable intra frame prediction technique provides same coding efficiency as the current nine-mode intra frame prediction technique in a high-complexity codec and as the previous six-mode intra frame prediction technique in a low-complexity codec.

What is claimed is:

1. A method of motion picture encoding comprising the steps of:
   defining a plurality of intra frame prediction modes, said plurality of intra frame prediction modes including a DC mode and a plurality of modes having respective differing prediction directions;
   forming a subset having a predetermined number of said plurality of intra frame prediction modes including said DC mode and some but not all of said plurality of modes having respective differing prediction directions;
   dividing a picture frame into a plurality of sub-blocks;
   selecting one of a low-complexity encoding and a high-complexity encoding;
   upon selection of said low-complexity encoding, determining an intra frame prediction mode for each sub-block from among said subset of intra frame prediction modes;
   upon selection of said high-complexity encoding, determining an intra frame prediction mode for each sub-block from among said plurality of intra frame prediction modes;
   transmitting compressed data including said determined intra frame prediction mode for each sub-block to a decoder.

2. The method of claim 1, wherein:
   said steps of defining said plurality of intra frame prediction modes and forming said subset having a predetermined number of said plurality of intra frame prediction modes occur once upon definition of an encoding standard.

3. The method of claim 1, further comprising the steps of:
   forming a probability table relating the intra frame prediction mode assigned to two adjacent sub-blocks to the intra frame prediction mode assigned to a current sub-block, for each combination of intra frame prediction mode assigned to each of said two adjacent sub-blocks, said probability table including a list of intra frame prediction modes arranged in order of probability of expected occurrence for the current block from the most probable to the least probable;
   adjusting each list for each combination of said probability table wherein the intra frame prediction modes of both adjacent sub-blocks within are said subset of intra frame prediction modes to include said predetermined number of intra frame prediction modes within said subset of intra frame prediction modes and a further number of intra frame prediction modes outside said subset of intra frame prediction modes; and wherein said step of transmitting compressed data including said determined intra frame prediction mode for each sub-block to a decoder includes transmitting a variable length code reference to an entry in said probability table for each sub-block indicating which prediction mode within said corresponding list is assigned to said sub-block.

4. The method of claim 3, wherein:

said steps of forming said probability table and adjusting each list for each combination of said probability table occur once upon definition of an encoding standard.

5. The method of claim 3, wherein:

said step of transmitting a variable length code reference to an entry in said probability table for each sub-block includes combining an indication of prediction modes for two sub-blocks into a single variable length code.

6. The method of claim 5, wherein:

said step of transmitting a variable length code reference to an entry in said probability table for each sub-block includes forming a universal variable length code table accessed by a combined probability value of the two combined pixels, said universal variable length code table including a subset of entries corresponding to said first predetermined number of probabilities of each list.

7. The method of claim 6, wherein said step of forming a universal variable length code table occurs once upon definition of an encoding standard.

8. The method of claim 1, wherein:

said step of defining a plurality of intra frame prediction modes consists of defining modes 0 through 8 for 4 by 4 pixel sub-blocks as follows mode 0 wherein if A, B, C, D, E, F, G and H are within the frame all pixels are predicted by (A+B+C+D+E+F+G+H)/8, if E, F, G and H are outside the frame all pixels are predicted by (A+B+C+D)/4, if A, B, C and D are outside the frame all pixels are predicted by (E+F+G+H)/, and if pixels A, B, C, D, E, F, G and H are outside the frame all pixels are predicted by 128, mode 1 wherein if A, B, C and D are within the frame then pixel a is predicted by (A+B)/2, pixel e is predicted by B, pixel b, i is predicted by (B+C)/2, pixels f, m are predicted by C, pixels c, j are predicted by C+D)/2 and pixels d, g, h, j, k, l, n, o and p are predicted by D, mode 2 wherein if pixels A, B, C and D are inside the frame then pixels a, e, i and m are predicted by pixel A, pixels b, f, j and n are predicted by pixel B, pixels c, g, k and l are predicted by pixel C and pixels g, h, l and p are predicted by pixel D, mode 3 wherein if all pixels A, B, C, D, E, F, G, H and I are inside the frame then pixel m is predicted by (H+2G+F)/4, pixels i and n are predicted by (G+2F+E)/4, pixels e, j and o are predicted by (F+2E+I)/4, pixels a, f, k and p are predicted by (E+2I+A)/4, pixels b, g and l are predicted by (I+2A+B)/4, pixels c and h are predicted by (A+2B+C)/4 and pixel d is predicted by (B+2C+D)/4, mode 4 wherein if pixels E, F, G and H are inside the frame, then pixels a, b, c and d are predicted by pixel E; pixels e, f, g and h are predicted by pixel F; pixels i, j, k and l are predicted by pixel G, and pixels m, n, o and p are predicted by pixel H, mode 5 wherein if pixels E, F, G and H are inside the frame, then pixel a is predicted by (E+F)/2, pixel b is predicted by F, pixels c and e are predicted by (F+G)/2, pixels f and d are predicted by G, pixels i and g are predicted by (G+H)/2 and pixels h, j, k, l, m, n, o and p are predicted by H, mode 6 wherein if pixels A, B, C, D, E, F, G, H and I are inside the frame, then pixels a and j are predicted by (I+A+1)/2, pixels b and k are predicted by (A+B+1)/2, c and l are predicted by (B+C+1)/2, pixel d is predicted by (C+D+1)/2, pixels e and n are predicted by (E+2I+A+2)/4, pixels f and o are predicted by (I+2A+B+2)/4, g and p are predicted by (A+2B+C+2)/4, h is predicted by (B+2C+D+2)/4, i is predicted by (I+2E+F+2)/4 and m is predicted by (E+2F+G+2)/4, mode 7 wherein if pixels A, B, C, D, E, F, G, H and I are inside the frame, then pixel a is predicted by 2(A+B+G)+F+H+4)/8, pixels b and i are predicted by (B+C+1)/2, pixels c and j are predicted by (C+D+1)/2, pixels d and k are predicted by (D+E+1)/2, pixel l is predicted by (E+F+1)/2, pixel e is predicted by (2(B+H)+A+C+G+H+4)/8, pixels f and m are predicted by (B+2C+D+2)/4, pixels g and n are predicted by (C+2D+E+2)/4, pixels h and o are predicted by (D+2E+F+2)/4 and pixel p is predicted by (E+2F+G+2)/4, mode 8 wherein if pixels A, B, C, D, E, F, G, H and I are inside the frame, then pixels a and g are predicted by (I+E+1)/2, pixels b and h are predicted by (E+2I+A+2)/4, pixel c is predicted by (I+2A+B+2)/4, pixel d is predicted by (A+2B+C +2)/4, pixels e and k are predicted by (E+F+1)/2, pixels f and 1 are predicted by (I+2E+F+2)/4, pixels i and o are predicted by (F+G+1)/2, pixels j and p are predicted by (E+2F+G+2)/4, pixel m is predicted by (G+H+1)/2 and n is predicted by (F+2G+H+2)/4;

wherein pixels a through p are respective pixels of said 4 by 4 pixel sub-block, pixels A, B, C and D are pixels of another block disposed above respective columns of said 4 by 4 sub-block, pixels E, F, G and H are pixels of another block disposed to the left of respective columns of said 4 by 4 sub-block and pixel I is a pixel of another sub-block disposed above and left of said 4 by 4 sub-block.

9. The method of claim 8, wherein:

forming a probability table relating the intra frame prediction mode assigned to a first adjacent sub-block disposed above the sub-block and to a second adjacent sub-block disposed left of the sub-block to the intra frame prediction mode assigned to a current sub-block, for each combination of intra frame prediction mode assigned to each of said two adjacent sub-blocks, said probability table including a list of intra frame prediction modes arranged in order of probability of expected occurrence for the current block from the most probable to the least probable and adjusted wherein the intra frame prediction modes of both adjacent sub-blocks within are said subset of intra frame prediction modes to include said predetermined number of intra frame prediction modes within said subset of intra frame prediction modes and a further number of intra frame prediction modes outside said subset of intra frame prediction modes, said probability consisting of

| B/A | Outside | 0 | 1 | 2 | 3 |
|---|---|---|---|---|---|
| Outside | 0-------- | 021------ | 102------ | 201------ | 012------ |
| 0 | 045------ | 041253687 | 104235687 | 230145678 | 304215687 |
| 1 | 045------ | 014253678 | 102435678 | 201345678 | 032154687 |
| 2 | 045------ | 024135678 | 120345678 | 210345678 | 302145687 |
| 3 | 045------ | 304152867 | 310425687 | 231054687 | 304215687 |
| 4 | 405------ | 403512867 | 401523867 | 245031687 | 430512867 |
| 5 | 504------ | 504312867 | 015432687 | 204513687 | 530412687 |
| 6 | 504------ | 016234758 | 261308457 | 216304578 | 360214857 |
| 7 | 504------ | 015463278 | 102576438 | 215680347 | 025136478 |
| 8 | 504------ | 840315627 | 038145627 | 234185607 | 384156207 |

| B/A | 4 | 5 | 6 | 7 | 8 |
|---|---|---|---|---|---|
| Outside | 012------ | 012------ | 012------ | 012------ | 012------ |
| 0 | 043152867 | 045132687 | 602314587 | 014627538 | 048356217 |
| 1 | 041253867 | 014532678 | 261354087 | 160275438 | 024385167 |
| 2 | 042513687 | 012543687 | 261350487 | 261705348 | 230451867 |
| 3 | 403512867 | 304512867 | 360214587 | 015364278 | 380456217 |
| 4 | 405312867 | 405132867 | 456231807 | 401537268 | 480531267 |
| 5 | 450312867 | 504132687 | 560243187 | 415073286 | 584631207 |
| 6 | 401362578 | 145062387 | 623105487 | 015462738 | 034816257 |
| 7 | 064517328 | 501436278 | 320156478 | 102574683 | 051348726 |
| 8 | 480315627 | 048351627 | 304682157 | 041368257 | 843025617; | and wherein said step of transmitting compressed data including said determined intra frame prediction mode for each sub-block to a decoder includes transmitting a variable length code reference to an entry in said probability table for each sub-block indicating which prediction mode within said corresponding list is assigned to said sub-block.

10. The method of claim 9, wherein:

said step of transmitting a variable length code reference to an entry in said probability table for each sub-block includes combining an indication of prediction modes for two sub-blocks into a single variable length code.

11. The method of claim 10, wherein:

said step of transmitting a variable length code reference to an entry in said probability table for each sub-block includes forming a universal variable length code table accessed by a combined probability value of the two combined pixels, said universal variable length code table consisting of

| 0 | 2 | 5 | 6 | 11 | 15 | 16 | 24 | 46 |
|---|---|---|---|---|---|---|---|---|
| 1 | 4 | 9 | 12 | 22 | 25 | 30 | 38 | 59 |
| 3 | 8 | 14 | 20 | 27 | 36 | 32 | 52 | 63 |
| 7 | 13 | 21 | 29 | 37 | 43 | 45 | 56 | 70 |
| 10 | 19 | 28 | 35 | 39 | 47 | 53 | 60 | 71 |
| 18 | 23 | 34 | 42 | 49 | 55 | 61 | 68 | 76 |
| 17 | 26 | 33 | 41 | 44 | 54 | 62 | 66 | 75 |
| 31 | 40 | 50 | 48 | 57 | 65 | 69 | 73 | 79 |
| 51 | 58 | 64 | 67 | 72 | 74 | 77 | 78 | 80. |

12. The method of claim 1, wherein:

said step of selecting one of a low-complexity encoding and a high-complexity encoding occurs once upon manufacture of an encoder.

13. The method of claim 1, wherein:

said step of selecting one of a low-complexity encoding and a high-complexity encoding occurs for each encoding of a motion picture.

\* \* \* \* \*